(12) United States Patent
Hara et al.

(10) Patent No.: US 7,472,451 B2
(45) Date of Patent: Jan. 6, 2009

(54) BLADE SUPPORTING APPARATUS IN WIPER APPARATUS

(75) Inventors: Takeshi Hara, Kiryu (JP); Takeo Suzuki, Kiryu (JP); Mamoru Kagawa, Wako (JP); Shunichi Koguchi, Wako (JP)

(73) Assignees: Mitsuba Corporation, Kiryu-shi (JP); Honda Giken Kogyo Kabushiki Kaisha, Tokyo (JP)

( * ) Notice: Subject to any disclaimer, the term of this patent is extended or adjusted under 35 U.S.C. 154(b) by 911 days.

(21) Appl. No.: 10/500,914

(22) PCT Filed: Feb. 4, 2003

(86) PCT No.: PCT/JP03/01146
§ 371 (c)(1),
(2), (4) Date: Jul. 8, 2004

(87) PCT Pub. No.: WO03/068570
PCT Pub. Date: Aug. 21, 2003

(65) Prior Publication Data
US 2005/0076463 A1 Apr. 14, 2005

(30) Foreign Application Priority Data
Feb. 13, 2002 (JP) ............................. 2002-035755
Sep. 6, 2002 (JP) ............................. 2002-261942

(51) Int. Cl.
B60S 1/40 (2006.01)
B60S 1/32 (2006.01)
B60S 1/34 (2006.01)
(52) U.S. Cl. .............................. 15/250.351; 15/250.32; 15/250.44; 15/250.46
(58) Field of Classification Search ............. 15/250.351, 15/250.46, 250.44, 250.43, 250.31, 250.32
See application file for complete search history.

(56) References Cited

U.S. PATENT DOCUMENTS 3,123,849 A * 3/1964 O'Shei .................. 15/250.351
5,729,861 A * 3/1998 Journee ................. 15/250.351
6,415,473 B1 * 7/2002 Rapp ..................... 15/250.351

(Continued)

FOREIGN PATENT DOCUMENTS

DE 37 44 237 A1 7/1989

(Continued)

Primary Examiner—Gary K Graham
(74) Attorney, Agent, or Firm—Oliff & Berridge, PLC

(57) ABSTRACT

In a structure in which a middle portion of a wiper blade is pivoted to a leading end portion of a wiper arm via a pivot substantially orthogonal to an arm length direction so as to freely oscillate, and a supporting member supporting a portion closer to a wiper shaft than the middle portion of the wiper blade is provided in the wiper arm, the structure reduces a sliding resistance which occurs due to a movement of the wiper blade toward and away from a window surface. A stabilizer has an upper piece portion and a pair of side piece portions, a supporting concave portion supporting a wiper blade in an outward fitting manner is formed, and a plurality of ribs which extend toward the window surface are formed on inner surfaces of the side piece portions, thereby being in linear contact with outer surfaces of side piece portions of a support receiving body which is fitted to a first lever terminal end portion of the wiper blade.

19 Claims, 11 Drawing Sheets

U.S. PATENT DOCUMENTS 6,820,302 B2 * 11/2004 Zimmer .................. 15/250.32
6,820,303 B2 * 11/2004 Zimmer et al. ........... 15/250.43

FOREIGN PATENT DOCUMENTS

| DE | 38 29 343 A1 | | 3/1990 |
|---|---|---|---|
| DE | 196 05 428 A1 | | 8/1997 |
| DE | 198 24 365 A1 | | 12/1999 |
| GB | 2240264 | * | 7/1991 |
| JP | U 63-79256 | | 5/1988 |
| JP | A 9-164917 | | 6/1997 |
| JP | 10-297437 | * | 11/1998 |
| JP | A 2001-501893 | | 2/2001 |

* cited by examiner

BLADE SUPPORTING APPARATUS IN WIPER APPARATUS

This application is a national stage application of PCT/JP03/01146 filed Feb. 4, 2003 which claims priority from JP 2002-35755 filed Feb. 13, 2002 and JP 2002-261942 filed Sep. 6, 2002, the disclosures of which are incorporated in their entirety herein by reference thereto.

BACKGROUND OF THE INVENTION

1. Technical Field

The invention relates to a technical field of a blade supporting apparatus in a wiper apparatus which is equipped in a vehicle such as a private car, a truck, a bus or the like.

2. Description of Related Art

In general, in this kind of wiper apparatus, there is a structure such that a wiper blade provided in a leading end portion of a wiper arm, reciprocates forward and reverse so as to wipe a window surface on the basis of the normal and reverse rotation of a wiper shaft integrally mounted to a base end portion of the wiper arm. In this wiper apparatus, the structure is generally made such that a middle portion of the wiper blade is pivoted to the leading end portion of the wiper arm via a pivot substantially orthogonal to an arm length direction so as to freely oscillate, and the wiper blade wipes the window surface following the reciprocal and reverse oscillation of the wiper arm in correspondence to the normal and reverse rotation of the wiper shaft. In this wiper apparatus, for example, in the case that a long wiper blade wipes the window surface for a large-size wiper apparatus, or in the case that a range of the reciprocal and reverse oscillation is made wide, or the like, there is a case that a terminal end side, corresponding to a portion in the side of the wiper shaft of the wiper blade, tends to be late in a wiping speed in comparison with the leading end side, whereby a following property of the wiper arm is deteriorated.

Then, it is proposed to support the terminal end side of the wiper blade by a supporting member, provided in the wiper arm, so as to increase the following property of the wiper arm, for example, there is a structure described in Japanese National Stage Patent Publication 2001-501893 of WO99/05009. The supporting member in this structure is fixed to the wiper arm, and is structured so as to support the wiper blade at one side in the oscillating direction of the wiper arm. In this case, in recent years, the window surface tends to be formed in a curved shape, and the wiper blade oscillates in a direction of the window surface (a direction of moving close to or apart from the window surface) around the pivot corresponding to a supporting point with respect to the wiper arm. Accordingly, in this wiper apparatus, the structure is made such that a supporting concave portion, constituting the supporting member and formed in a concave groove shape, is provided in one side of the wiper arm, a support receiving body is integrally provided in the side of the wiper blade, and the support receiving body is slidably inward fitted into the supporting concave portion, thereby allowing the wiper blade to oscillate in the window surface direction.

In this case, the conventional supporting member mentioned above is structured such that the support receiving body oscillates in the window surface direction within the supporting concave portion, however, the supporting concave portion and the support receiving body are in a surface-to-surface contact state with each other.

SUMMARY OF THE INVENTION

As a result of the structure of the wiper blade in the related art, when the wiper blade oscillates in the window surface direction, as the support receiving body slides within the supporting concave portion in a surface-to-surface contact manner, a sliding resistance is generated between the support receiving body and the supporting concave portion, and there is a risk that a smooth oscillation of the wiper blade is deteriorated, which is problematic. Further, in this wiper apparatus, because each of the wiper arm fixing portion, the supporting concave portion and the support receiving body is structured as one unit in a connected state, there are problems that the wiper apparatus is deteriorated in design due to an exposure of the supporting member. In addition, a structure of the supporting member becomes complex and large sized. Thus, these are problems to be solved by the invention.

The invention is made by taking the matters mentioned above into consideration and to solve the problems. According to an exemplary embodiment, there is provided a wiper apparatus in which a wiper blade mounted to a leading end portion of a wiper arm wipes a window surface in correspondence to a normal and reverse rotation of a wiper shaft integrally mounted to a base end portion of the wiper arm, wherein a middle portion of the wiper blade is pivotably supported by the leading end portion of the wiper arm via a pivot substantially orthogonal to an arm length direction so as to freely oscillate and a supporting member provided in the wiper arm supports movably the portion of the wiper blade nearer to the wiper shaft side than the middle portion of the wiper blade in a window surface direction, the supporting member comprising a supporting concave portion formed in the supporting member so as to support the wiper blade and a plurality of ribs elongated in the window surface direction formed on an inner surface of the supporting concave portion so as to be in linear contact with the wiper blade.

In accordance with the structure mentioned above, because the movement of the wiper blade with respect to the supporting member is performed in a linear contact state, whereby a sliding resistance is reduced, a smooth wiping operation can be performed, and it is possible to increase a durability.

In this structure, the supporting member can be structured such that an upper piece portion constituting the supporting concave portion is fixed to the wiper arm.

Further, in this structure, the wiper arm can be structured such that a base end portion of an arm piece in which the wiper blade is mounted to a leading end portion thereof is fixed to a leading end portion of an arm shank formed in a substantially C shape in a cross section in such a manner as to be inward fitted, and the supporting member is fixed to the base end portion of the arm piece via a bolt screwed from an inside of the supporting concave portion, and is fixed to the leading end portion of the arm shank together with the arm piece. Accordingly, almost a whole of the supporting member, including the screwed portion using the bolt, is covered by the wiper arm, and it is possible to obtain a structure excellent in design.

In this structure, the wiper apparatus can be structured such that a positioning means for fitting the arm piece in a positioning manner is formed in an assembling portion of the supporting member with the arm piece. In this manner, it is possible to improve assembling accuracy of the supporting member.

Furthermore, in this structure, the positioning means can be constituted by a pair of protruding pieces faced to an arm length direction of the wiper arm and a protruding piece orthogonal to the arm length direction and against which a base end edge of the arm piece is struck, and is used also as anti-vibration means for preventing a stabilizer from vibrating with respect to the arm piece. In this way, the structure can be made such as to be provided with the functions of positioning and of vibration preventing. Accordingly, it is possible to use the member commonly.

Moreover, in this structure, the supporting member can be structured so as to support a blade lever constituting the wiper blade, and a support receiving body inward fitted to the supporting concave portion of the supporting member is provided in a supporting portion of the blade lever in a manner to prevent coming-off.

In addition, in this structure, the supporting portion of the blade lever, by the supporting member, is disposed near a pivot portion pivoting a first lever connected to the wiper arm and a second lever, and at least one rib in the supporting concave portion is structured so as to oppose to a pin fastened to the pivot portion.

In this structure, a through hole allowing both end portions of a pin pivoting the first lever and the second lever to protrude and to expose to the outside is opened in the support receiving body.

Further, in this structure, the support receiving body can be structured such that the support receiving body is open on the window surface side to be formed in a substantially C cross sectional shape, and the support receiving body is provided with a fitting and attaching portion fitting to the pivot portion pivoting the first lever and the second lever. An extension portion is extended from the fitting and attaching portion so as to be interfered with the second lever and regulating a movement of the second lever in a wiping direction. In this way, it is possible to increase a following property of the wiper blade with respect to the wiper arm via the stabilizer in a stable state with no play.

Furthermore, in this structure, the fitting and attaching portion of the support receiving body is formed thinner than the extension portion, and the structure can be made such that the fitting to the first lever is achieved by an elastic deformation of the fitting and attaching portion. This makes it possible to simply and easily perform the mounting operation of the support receiving body.

Moreover, the structure can be made such that a first step portion engaging with the first lever in the window surface direction, so as to achieve a come-off prevention, and a second step portion engaging with the first lever in the lever length direction, so as to achieve a come-off prevention, are formed in the fitting and attaching portion of the support receiving body. In this manner, it is possible to fix the support receiving body to the wiper blade in a manner to prevent coming-off.

In addition, the second step portion can be formed so as to be positioned at both end portions of the first step portion in the lever length direction.

Further, at least one second step portion can be continuously formed in the first step portion.

BRIEF DESCRIPTION OF DRAWINGS

The invention will be described with reference to the drawings, in which.

DETAILED DESCRIPTION OF THE PREFERRED EMBODIMENTS

Figure 1:
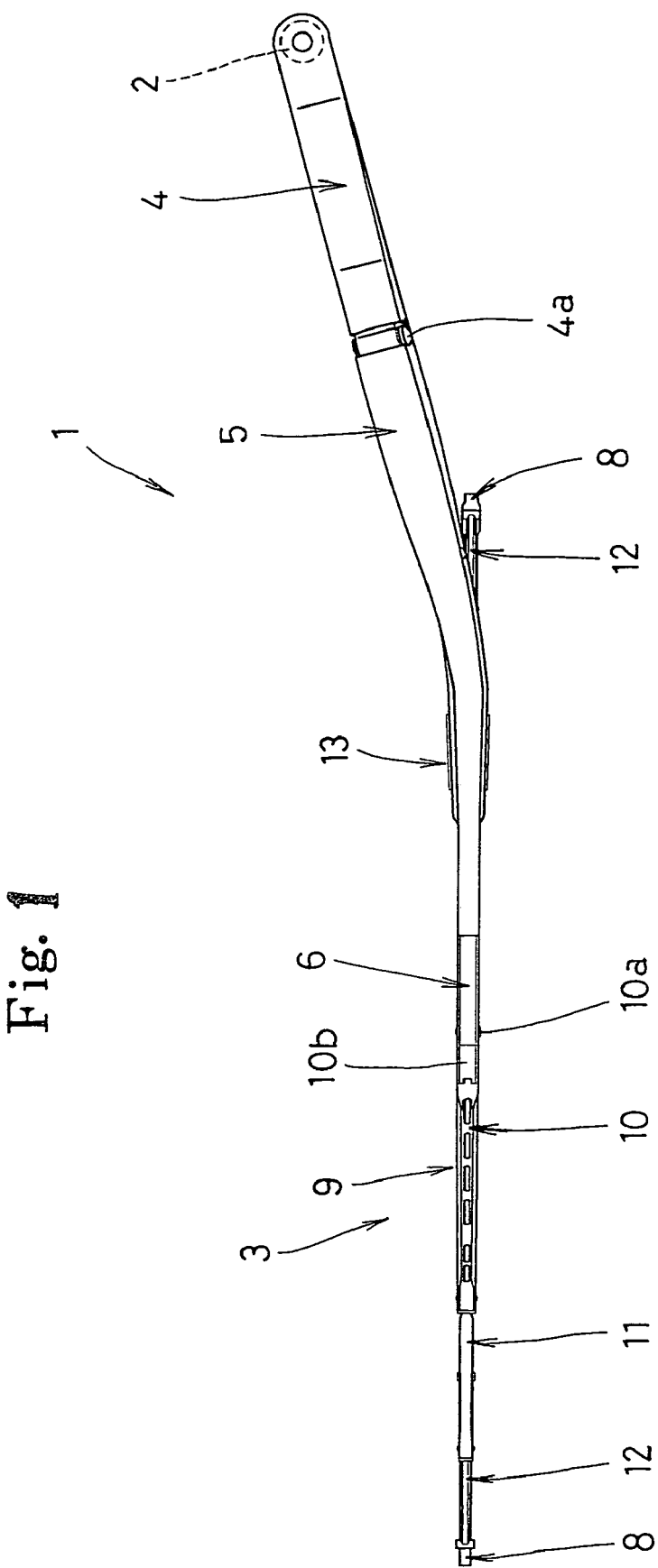
FIG. 1 is a front elevational view of a wiper apparatus.

In the drawings, reference numeral 1 denotes a wiper arm of a wiper apparatus. A base end portion of the wiper arm 1 is integrally fastened to a pivot shaft (a wiper shaft) 2 rotatably supported to a vehicle main body. Further, the wiper arm 1 reciprocally and reversely oscillates on the basis of normal and reverse rotation of the pivot shaft 2, whereby a wiper blade 3 mounted to a leading end portion of the wiper arm 1 performs a wiping operation of a window surface. This basic structure, i.e., the wiper arm 1, wiper shaft 2, and wiper blade 3, as a generalized description, is the same as the conventional structure.

Figure 2:
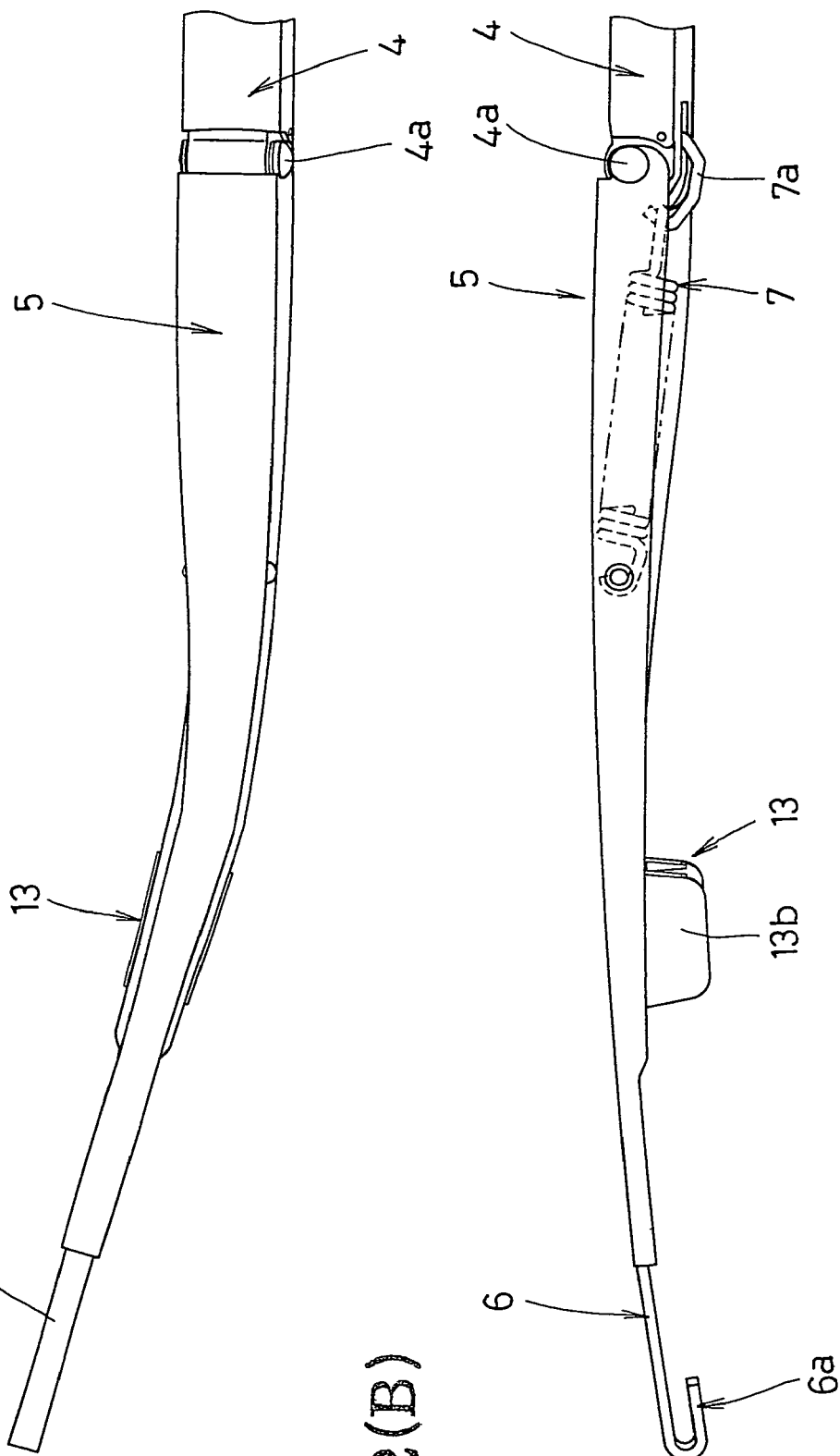
FIG. 2A is a front elevational view of a part of a wiper arm.
FIG. 2B is a side elevational view of FIG. 2A.

The wiper arm 1 comprises an arm support 4, a base end portion of which is integrally mounted to the pivot shaft 2; an arm shank 5, a base end portion of which is supported to a leading end portion of the arm support 4 via a pin 4a supported orthogonal to the arm length direction, the arm shank 5 being connected so as to freely swing in the directions of moving close to or apart from the window surface (a window surface direction); and an arm piece 6, a base end portion of which is integrally connected to the leading end portion of the arm shank 5 so as to be covered by the leading end portion of the arm shank 5. Further, a supporting portion 6a (FIG. 2(B)), bent in a U shape, is formed in the leading end portion of the arm piece 6, and the structure is such that the wiper blade 3 is connected to and supported by the supporting portion 6a. In addition, the wiper arm 1 is structured such that a spring member 7 is provided between the leading end portion of the arm support 4 and the base end side of the arm shank 5 via a hook 7a, so that the supporting portion 6a in the leading end of the arm piece 6 is urged toward a window surface.

Figure 3:
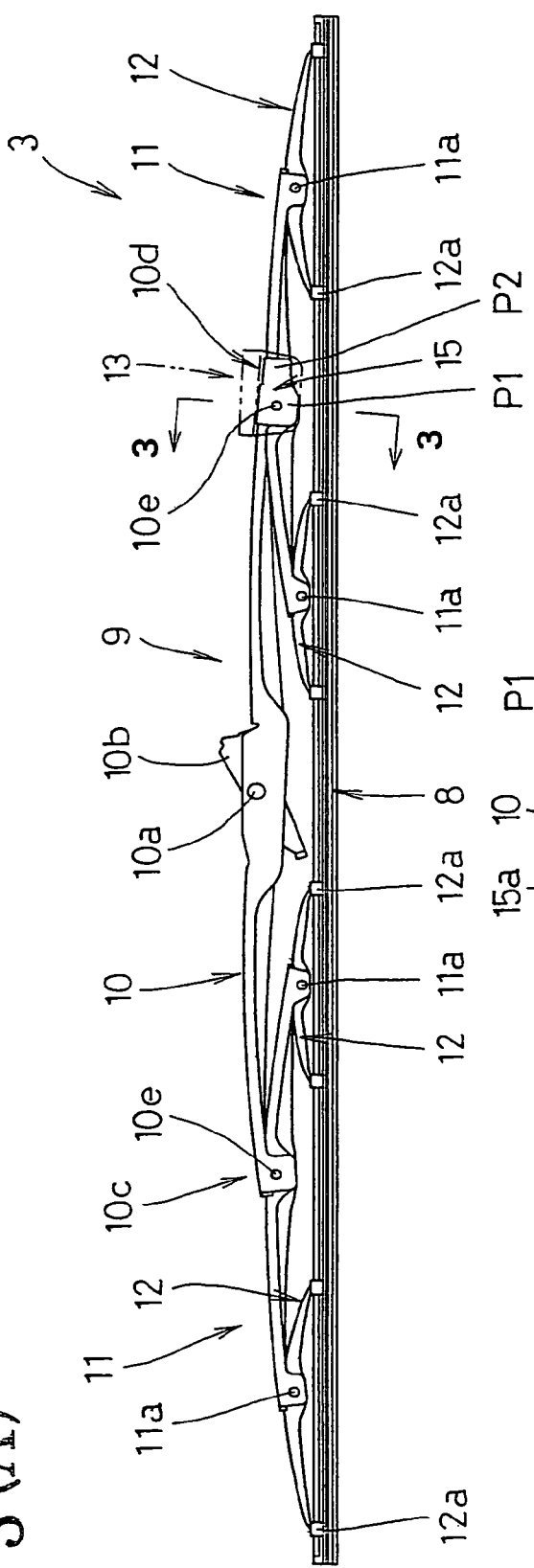
FIG. 3A is a side elevational view of a wiper blade.
FIG. 3B is a cross sectional view along a line 3-3 in FIG. 3A.
Figure 4:
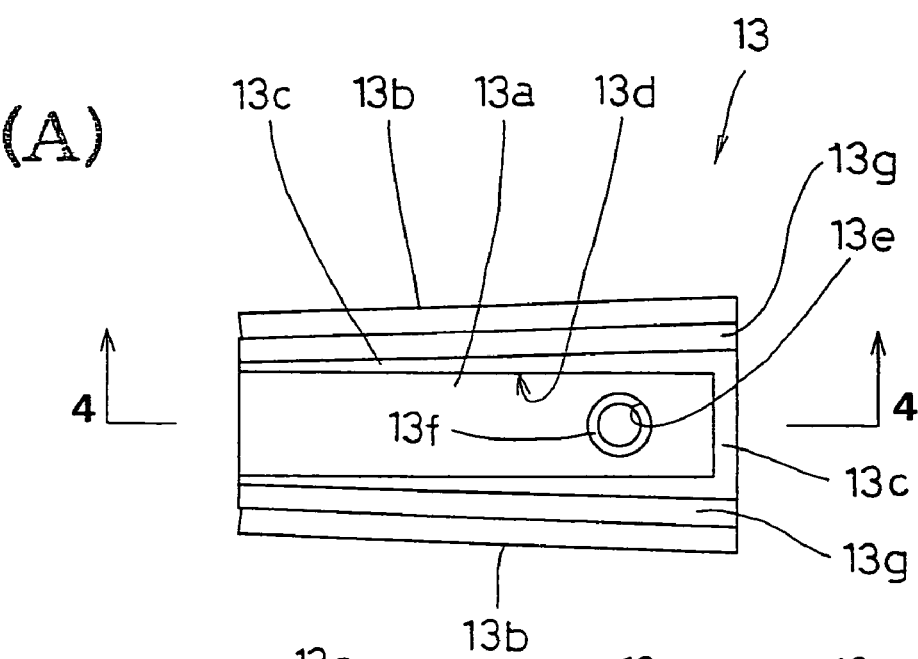
FIG. 4A is a front elevational view of a stabilizer.
FIG. 4B is a side elevational view of the stabilizer.
FIG. 4C is a cross sectional view along a line 4-4 in FIG. 4A.
Figure 4:
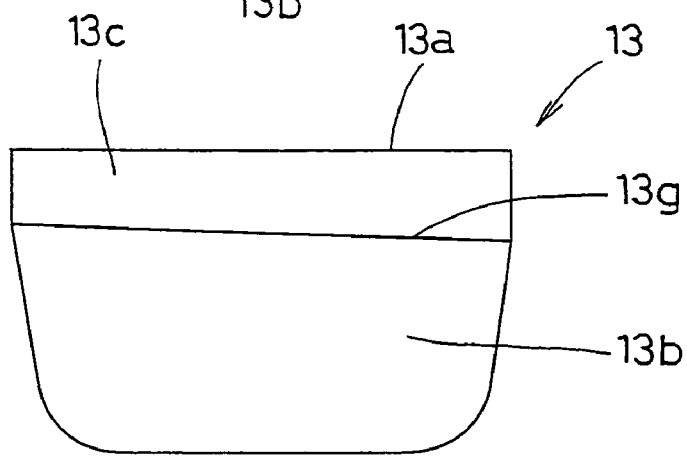
Figure 4:
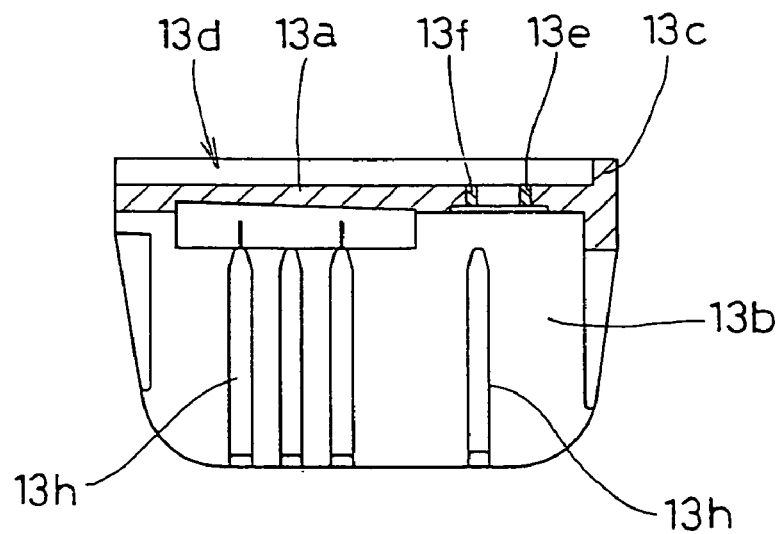

On the other hand, the wiper blade 3 (best seen in FIG. 3(A)) is formed in a long shape, and is constituted by a blade rubber 8 made of rubber, and a blade lever 9 supporting the blade rubber 8. The blade lever 9 is provided for supporting a plurality of portions in a longitudinal direction of the blade rubber 8. In this structure, a first lever 10 of the blade lever 9 is provided with a pin 10a in a middle portion in a longitudinal direction. A clip 10b for connecting to the wiper arm 1 is swingably pivoted to the pin 10a. Further, middle portions in a longitudinal direction of one of two second levers 11 are swingably pivoted at each end portion 10c, 10d of the first lever 10 via pins 10e. In this structure, a stabilizer 13, described below, is externally fitted to the first lever terminal end portion 10d at the wiper shaft 2 side, of the two end portions of the first lever 10. Further, middle portions in a longitudinal direction of one of four third levers 12 are swingably pivoted to each end portion of each of the pair of second levers 11 via pins 11a, respectively. In this structure, supporting piece portions 12a are integrally formed in each end portion of the third levers 12 to fixedly support upper end portions disposed at eight positions in a longitudinal direction of the blade rubber 8 (portions in a side moving part away from the window surface). The wiper blade 3 structured in the manner mentioned above is set such that connection to the wiper arm 1 can be achieved by detachably engaging the clip 10b of the first lever 10 of the blade lever 9 with the arm piece supporting portion 6a.

Figure 5:
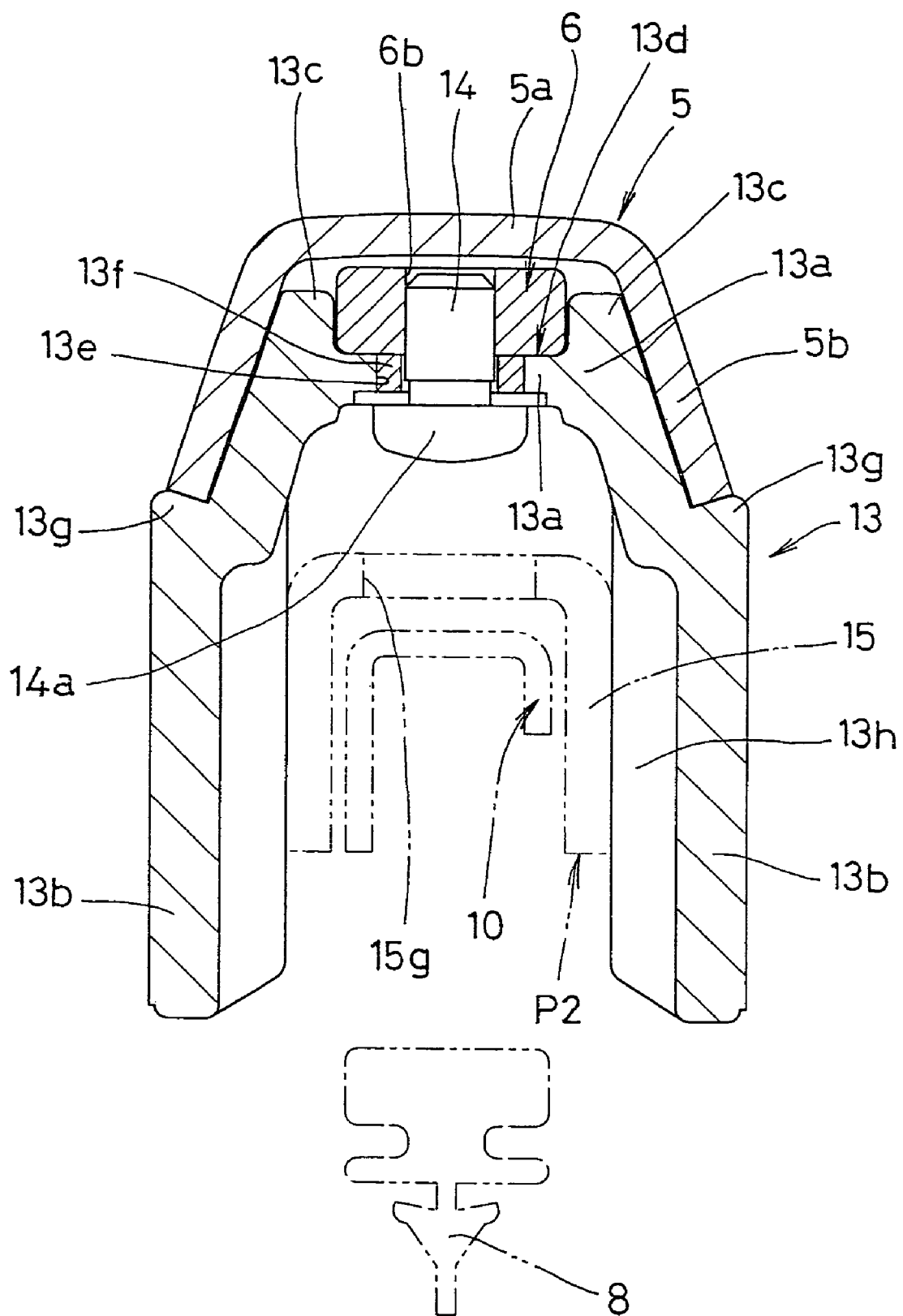
FIG. 5 is a cross sectional view of a stabilizer mounting portion in the wiper arm.

The arm shank 5 is provided with an upper piece portion 5a (FIG. 5) opposed to the window surface and a pair of side piece portions 5b extending toward the window surface side from both side edge portions (side edge portions of the wiper arm 1 in a swinging direction) of the upper piece portion 5a, so that the arm shank 5 is formed in a substantially C cross sectional shape. Further, the base end portion of the arm piece 6 is fixed along an inner surface in the side of the leading end of the arm shank upper piece portion 5a, and is structured to be covered with the upper piece portion 5a. A fixing portion of the arm piece 6 to the arm shank 5 is set so as to be opposite to the first lever terminal end portion 10d of the wiper blade 3, and the stabilizer 13, described below (corresponding to the supporting member according to the invention), is fixed to the first lever terminal end portion 10d.

The stabilizer 13 is provided with an upper piece portion 13a opposing the window surface and a pair of side piece portions 13b extending toward the window surface side from both side edge portions of the upper piece portion 13a. The stabilizer 13 is formed as a supporting concave portion having a substantially C cross sectional shape. In addition, a protruding portion 13c protruding to an upper side from an outer peripheral edge portion except the leading end side is integrally formed in the upper piece portion 13a of the stabilizer 13, and a mounting concave portion 13d is formed on an upper surface of the upper piece portion 13a. The protruding piece 13c is set to have a size corresponding to a thickness of the arm piece 6, and the structure is made such that an upper surface of the arm piece 6 and an upper end edge portion of the protruding piece 13c are substantially flush formed at a time of fitting the base end portion of the arm piece 6 into the concave portion 13d.

Figure 7:
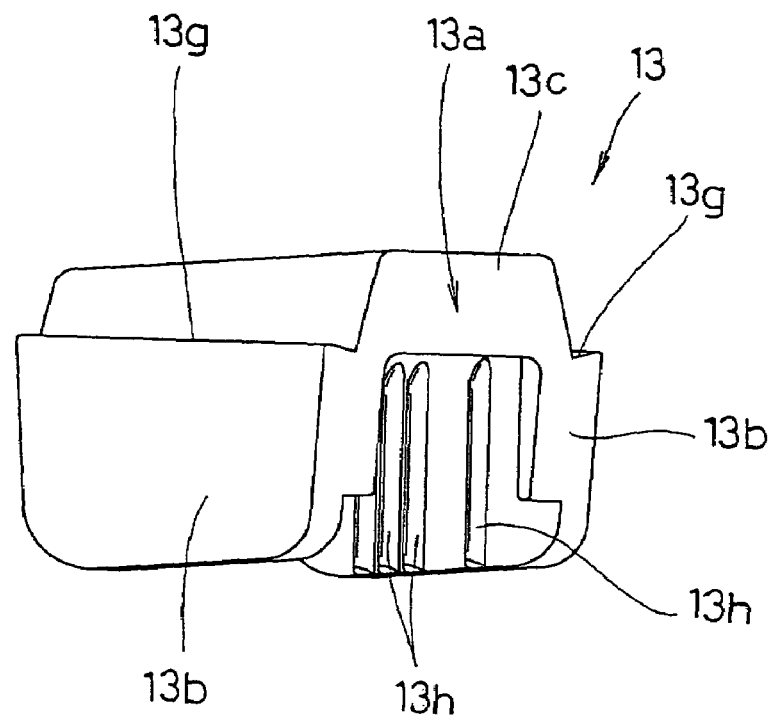
FIG. 7A is a perspective view of the stabilizer.
FIG. 7B is an exploded perspective view which shows an assembling state of the stabilizer into the arm piece.
Figure 7:
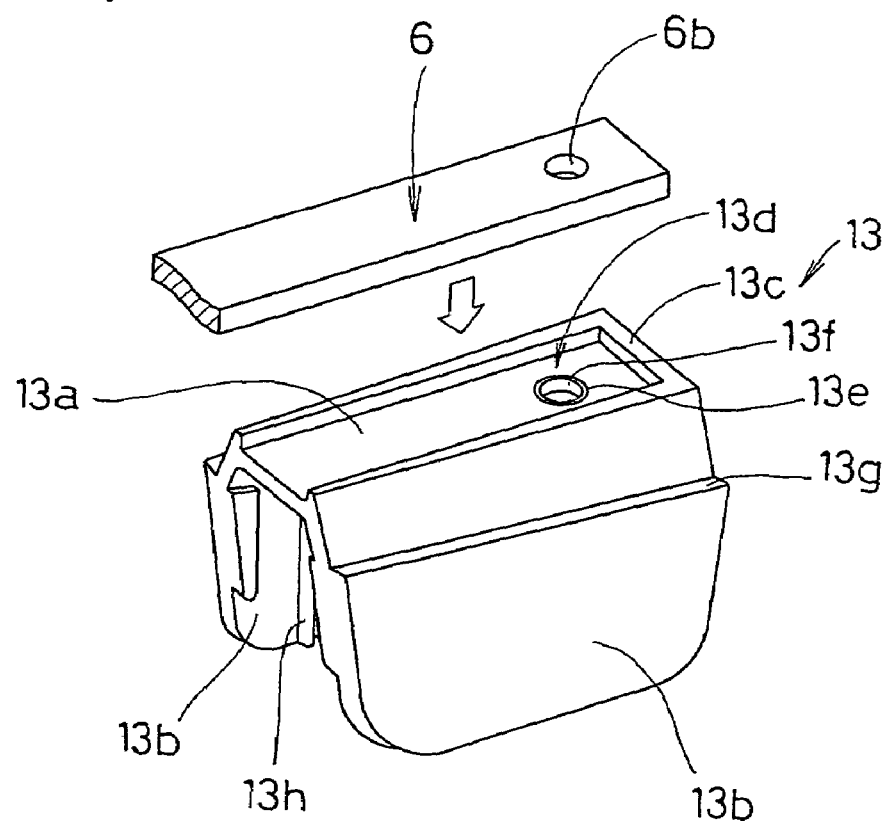

At this time, in the stabilizer 13, the protruding piece 13c positioned in a base end side of the mounting concave portion 13d functions as a positioning element. The portion of the protruding piece 13c formed in an orthogonal state, i.e., an end portion, to the arm length direction contacts the base end edge portion of the arm piece 6 (FIG. 7(B)), so that it is possible to position the stabilizer 13 in an arm length direction with respect to the arm piece 6. Further, positioning in the oscillating direction is performed by a pair of opposing protruding pieces 13c, and at the same time the opposing protruding pieces 13c function as oscillation preventing means (rotation preventing means) of the stabilizer with respect to the arm piece 6. In this assembled state, it is set such that the stabilizer 13 and the arm piece 6 are fixed by screwing a bolt 14 inserted from the inside of the stabilizer 13 into a through hole 13e of the stabilizer upper piece portion 13a and a through hole 6b of the base end portion of the arm 6. Note that reference numeral 13f denotes a collar provided in the through hole 13e in the stabilizer 13.

Then, the stabilizer 13 is assembled in the wiper arm 1 by fixing the base end portion of the arm piece 6 having the stabilizer 13 assembled thereto as described above, to the inner surface of the leading end portion in the arm shank upper piece portion 5a. A slightly protruding positioning protruding portion 5c (FIG. 6(A)) is formed in an inner surface of the arm shank upper piece portion 5a. On the other hand, a bent portion 6c is formed in the base end portion of the arm piece 6, and the arm piece bent portion 6c is fixed along the positioning protruding portion 5c, so that the arm piece 6 can be positioned in the arm length direction with respect to the arm shank.

A step portion 13g (FIG. 5) is formed on an outer surface of the stabilizer side piece portion 13b, and it is set such that the lower end edge (the leading end edge) of the arm shank side piece portion 5b contacts an upper side surface of the step portion 13g, thereby both side pieces 13b of the stabilizer 13 being supported by both side pieces 5b of the arm shank. In addition, the structure is such that the stabilizer 13 can be positioned, in the window surface direction, with respect to the arm shank 5.

In this state, the stabilizer 13 is mounted to the wiper arm 1 in a state of being positioned in the arm length direction and positioned in the window surface direction. Accordingly, a positional relationship is established for the terminal end side of the wiper blade 3, when the wiper blade 3 is connected to the arm piece supporting portion 6a, that is, the first lever terminal end portion 10d is opposite to the mounting position of the stabilizer 13, as mentioned above.

On the other hand, reference numeral 15 denotes a support receiving body interposed between the stabilizer 13 at the side of the wiper arm 1 and the wiper blade 3. The support receiving body 15 is previously fixed to the first lever terminal end portion 10d.

Figure 8:
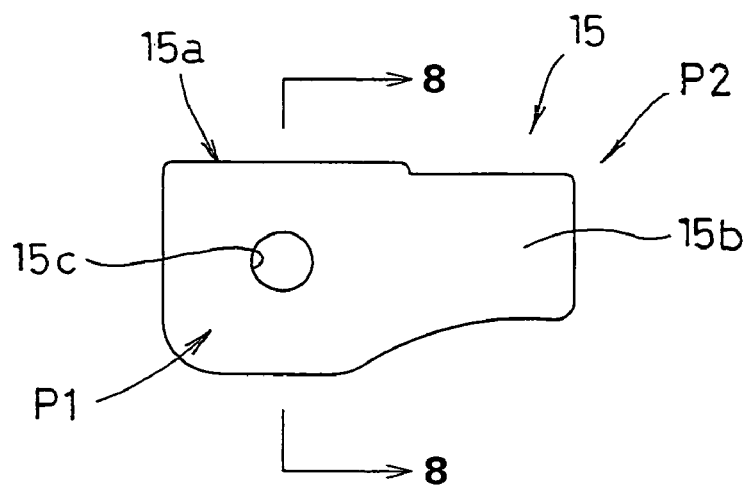
FIG. 8A is a side elevational view of a support receiving body.
FIG. 8B is a plan view of the support receiving body.
FIG. 8C is a bottom elevational view of the support receiving body.
FIG. 8D is a cross sectional view along a line 8-8 in FIG. 8A.
Figure 8:
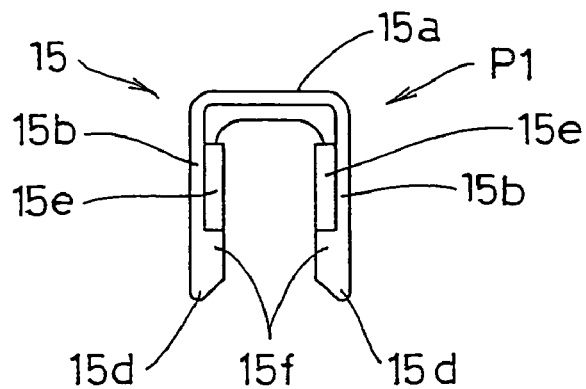
Figure 8:
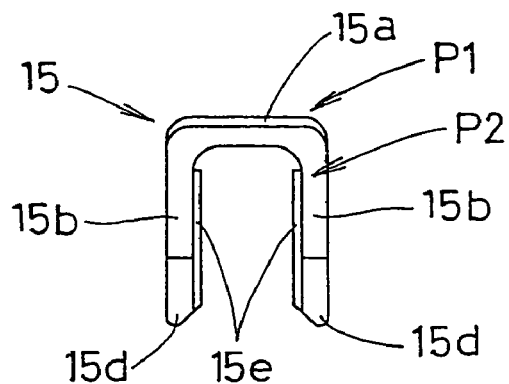
Figure 8:
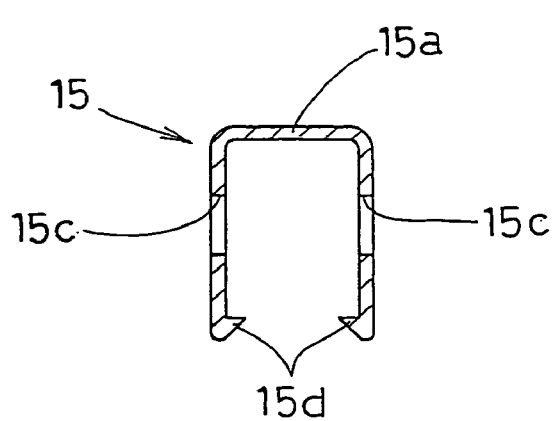

The support receiving body 15 is structured such that a fitting and attaching portion P1 is fixed to a pivot portion relatively pivoting a first lever 10 and a second lever 11 in a come-off prevention manner. The point at which fixed corresponds to the first lever terminal end potion 10d of the wiper blade 3. An extension portion P2 extending to a leading end side of the fitting and attaching portion P1 (FIG. 8(A)), that is, to a side of the wiper shaft 2 and opposed to the second lever 11, is integrally formed with the fitting and attaching portion P1. The support receiving body 15 is of a size in which it is entirely covered by the stabilizer 13. Further, the support receiving body 15 is formed in a substantially C cross sectional shape by the upper piece portion 15a, opposite to the window surface, and the pair of side piece portions 15b extending toward the window surface from both the right and left side edges of the upper piece portion 15a. The support receiving body 15 is structured such that the side piece portion 13b of the stabilizer 13 is fitted to an outer surface, the outer surface of the support receiving body 15 formed in a flat plate shape at the outer side of the pair of side piece portions 15b.

Furthermore, the support receiving body 15 is fitted and attached in an outwardly fitting state by elastically deforming both side piece portions 15b in the corresponding portion to the fitting and attaching portion P1 so as to press onto the first lever terminal end portion 10d, thereby being fixed (FIG. 3(B)). Through holes 15c are provided in both side piece portions 15b in the corresponding portion of the fitting and attaching portion P1 of the support receiving body, so that end portions protruding to the outside of the pivot pin 10e, constituting the pivot portion between the first lever terminal end portion 10d and the second lever 11, is loosely fitted within the through holes 15c. In this case, the support receiving body 15 is set such that the outer surfaces of both side piece portions 15b of the support receiving body are substantially at the same positions as those of both end portions of the pivot pin 10e, which can be seen from the through holes 15c, or at slightly retracted positions.

Figure 9:
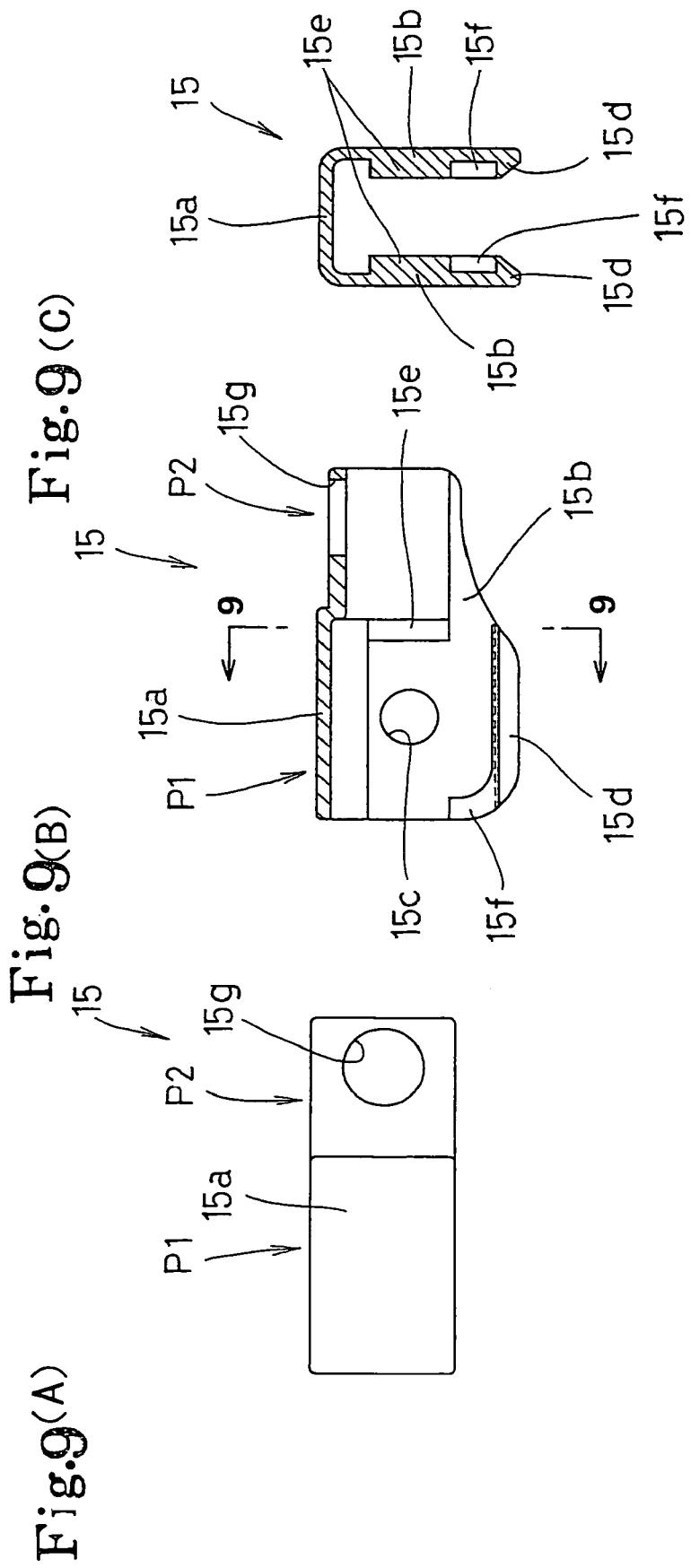
FIG. 9A is a front elevational view of the support receiving body.
FIG. 9B is a side elevation cross sectional view of the support receiving body.
FIG. 9C is a cross sectional view along a line 9-9 in FIG. 9B.
Figure 10:
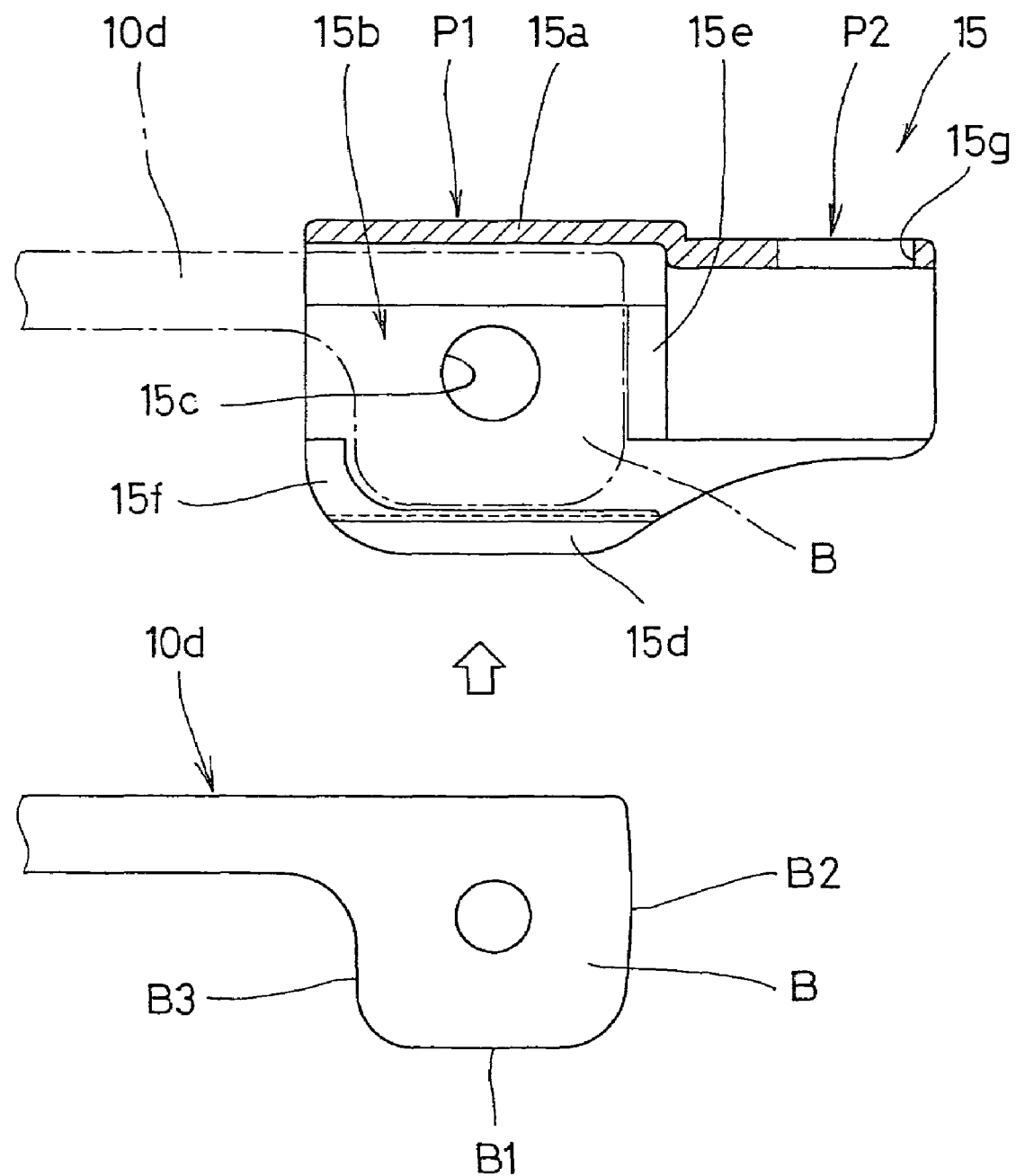
FIG. 10 is a side elevational view which shows a fitting state between a first lever terminal end portion and the support receiving body.

Moreover, an engagement hook (corresponding to a first step portion) 15d, engages the first lever terminal end portion 10d at the side toward the window surface. An engagement hook 15d for preventing the first lever terminal end portion 10d from separating from the support receiving body 15 is provided at an inner surface of the lower end portion (the window surface side portion) of each of the side piece portions 15b so as to protrude toward the inside of the support receiving body 15. Further, the support receiving body 15 is provided with a thick partition step portions (corresponding to the second step portions) 15e (FIGS. 8(B) and 9(B)) to define a boundary between the fitting and attaching portion P1 and the extension portion P2. More specifically, the thick partition step portions 15e project from the inner surfaces of the side piece portions 15b that oppose the leading end surface of the first lever terminal end portion 10d so as to partition between fitting and attaching portion P1 and extension portion P2 when fitted and fixed to the first lever terminal end portion 10d. In addition, step portions (also corresponding to the second step portions) 15f are formed in an inward protruding manner in each of the opposing portions of the fitting and attaching portion P1 of the side piece portions 15b on the inner surface of the base end side portion to be in a continuous state with the engagement hook 15d of that side. Accordingly, in the mounting state described above in which the support receiving body 15 is fitted and attached to the first lever terminal end portion 10d, a window surface side edge portion B1 (FIG. 10) of a rectangular pivot piece portion B formed in the first lever terminal end portion 10d and the engagement hook 15d are engaged at the side toward the window surface. Further, both end edge portions B2, B3 in the lever length direction, and the partition step portion 15e and the step portion 15f are respectively engaged in the lever length direction, whereby the support receiving body 15 and the first lever terminal end portion 10d are set such that they are prevented from coming apart in both the window surface direction and the lever length direction and proper positioning is achieved.

The partition step portion 15e is formed on the basis of a difference in thickness between the fitting and attaching portion P1 and the extension portion P2, whereby the fitting and attaching portion P1 is formed so as to be thinner than the extension portion P2. Accordingly, it is possible to simply and easily perform the mounting operation of fitting and attaching the fitting and attaching portion P1 to the terminal end portion of the first lever 10d.

Note that reference numeral 15g denotes a through hole opened in the upper piece portion 15a in the portion corresponding to the extension portion P2. The through hole 15g is formed for the purpose of preventing a bolt head 14a of the bolt 14, inserted from the inside so as to fasten the stabilizer 13 to the arm piece 6, from being interfered with by the support receiving body 15 when the window surface wiping operation is performed by the wiper apparatus and the stabilizer 13 oscillates toward and away from the window surface.

Further, the opposing distance between the side piece portions 13b of the stabilizer 13 is set to a size which allows the support receiving body 15 to slidably move in the window surface direction (i.e., toward and away from the window surface). The stabilizer 13 is mounted in a state of fitting over the support receiving body 15 holding the side piece portions 15b of the support receiving body 15 between the inner surfaces of the side piece portions 13b. A plurality of (four in the case of the present embodiment) ribs 13h, which extend toward the window surface and protrude to the inside, are formed on the inner surfaces of the side piece portions 13b of the stabilizer 13 in such a manner as to be arrayed along the arm length direction. When the stabilizer 13 is fitted to the support receiving body 15, leading end portions of the ribs 13h are set to be elastically brought into contact with the flat outer surfaces of the side piece portions 15b of the support receiving body. In this mounting state, when the wiper arm 1 reciprocally oscillates, the terminal end portion of the wiper blade 3 is brought under control in its movement in an oscillating direction by the side piece portions 13a of the stabilizer 13. Additionally, with respect to an oscillation of the wiper blade 3 toward and away from the window surface with respect to the wiper arm 1, it is set such that the oscillation is smoothly performed by allowing the leading end portions of the ribs 13h to slide along the outer surfaces of side pieces 15b in the support receiving body. Accordingly, the oscillation of the wiper blade 3 is achieved by the sliding of the leading end portions of the ribs 13h of the side piece portions 13b of the stabilizer 13 with respect to the flat surface constituted by the side piece portions 15b of the support receiving body 15. Thus, the sliding resistance which occurs between the stabilizer 13 and the support receiving body 15 is reduced, movement regulation of the wiper blade 3 in the wiping and oscillating directions is not deteriorated, and a following characteristic with respect to the curved surface of the window surface is improved.

Figure 6:
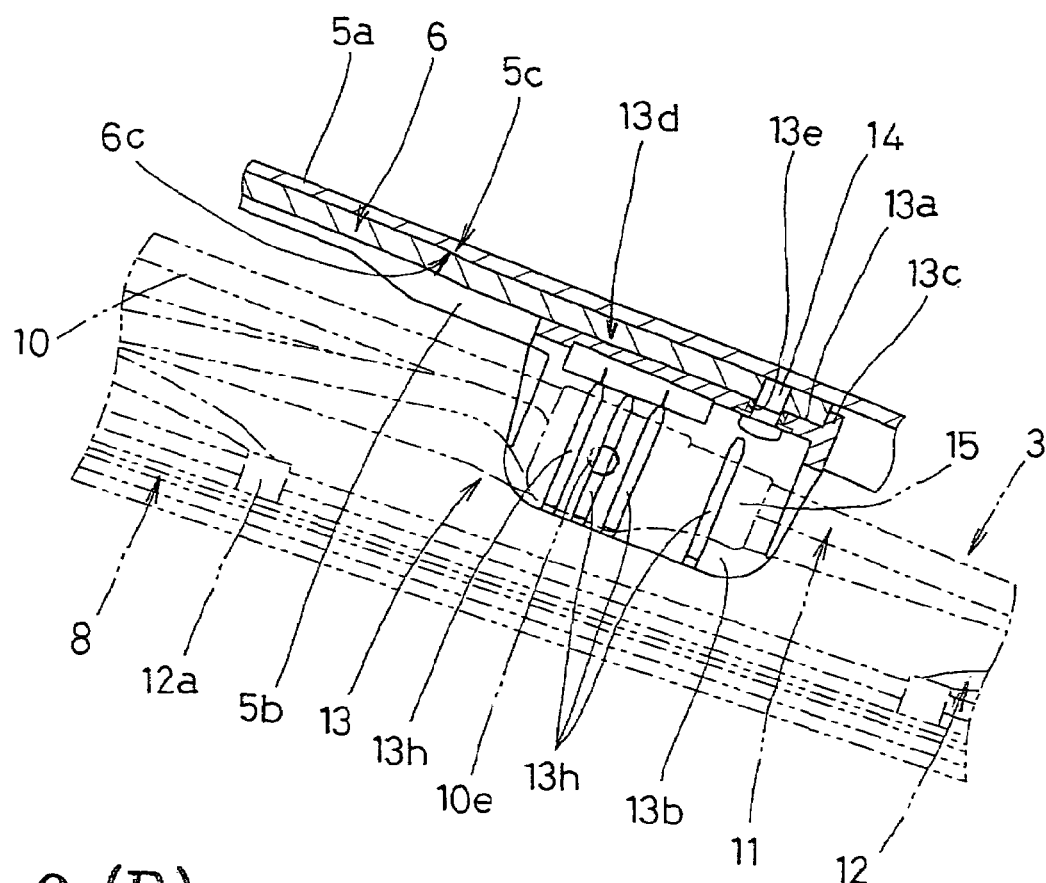
FIG. 6A is a cross sectional view which shows a stabilizer mounting state of the wiper arm.
FIG. 6B is a partly cross sectional view which shows the relationship between the stabilizer and the wiper blade.
Figure 6:
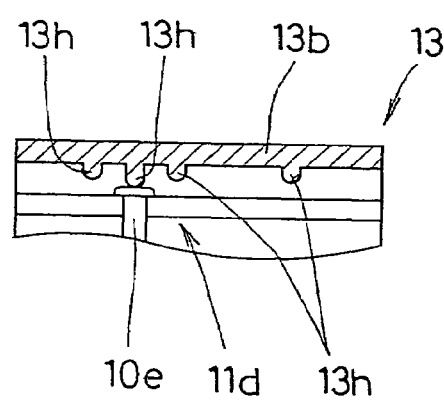

Moreover, the plurality of ribs 13h formed in the inner surfaces of the side piece portions 13b of the stabilizer are formed in a positional relationship that the ribs are brought into contact with the outer surfaces of the side piece portions 15b of the support receiving body 15. A second rib 13h from the leading end side of the wiper arm 1, of the ribs 13h, opposes the pin 10e (FIG. 6(A)) seen from the through hole 15c of the support receiving body 15. The second rib 13h is formed so as to slightly protrude from the other ribs 13h. Accordingly, as shown in FIG. 6(B), even when the support receiving body 15 is not provided in the wiper blade 3, the stabilizer 13 is set such that the second rib 13h is fitted and attached to the pin 10e in the side of the wiper blade 3 in a contact state.

In the exemplary embodiment structured as described above, the wiper arm 1 including the arm support 4, the arm shank 5, and the arm piece 6, has the stabilizer 13 provided in the connection portion between the arm shank 5, corresponding to the leading end portion of the wiper arm 1, and the arm piece 6. Further, a plurality of ribs 13h are formed on the inner surfaces of the side piece portions 13b of the stabilizer 13 so as to regulate the movement of the wiper blade 3, and the structure is such that the protruding end portion of the rib 13h and the outer surface of the support receiving body 15 in the wiper blade 3 are brought into contact with each other in a linear contact manner. Accordingly, when the wiper blade 3 oscillates toward and away from the window surface along the curved window surface, the support receiving body 15 of the oscillating wiper blade 3 and the stabilizer 13 fixed to the wiper arm 1, slide in the linear contact state between the outer surfaces of both side pieces 15b with the protruding end portions of the ribs 13h. Thus, the wiper blade 3 is allowed to oscillate with little sliding resistance although being effectively controlled by the side piece portions 13b of the stabilizer 13 in both the wiping and oscillating directions. Therefore, the window surface wiping operation performed by the wiper blade 3 is not deteriorated, and is smoothly performed, so that improvement in the durability of the wiper apparatus can be achieved and it is possible to provide a wiper apparatus having a high performance and a high quality.

Furthermore, in the described structure, the stabilizer 13 is supported such that the upper piece portion 13a and the upper side portions of the side piece portions 13b, providing the C cross sectional shape to support the wiper blade 13, are fitted within the concave portion constituted by the upper piece portion 5a and the side piece portions 5b of the arm shank 5. Therefore, substantially the entire stabilizer 13 is covered with the arm shank 5 when viewed from the outside of the window surface. Further, because substantially the entire support receiving body 15, at the side of the wiper blade 3, is covered by the stabilizer 13, the portion exposed to the outside is reduced in each of the members, and an excellent design structure can be achieved.

In addition, in this structure, because the stabilizer 13 is fixed to the base end portion of the arm piece 6 via the bolt 14, and the fixed portion is positioned at the portion along the inner surface of the upper piece portion 5a in the leading end portion of the arm shank 5, the screwed and fixed portion is covered with the arm shank upper piece portion 5a. As a result, the fixed portion and, additionally, the support receiving body 15 are not exposed to the rain or the like so as to improve a rust proof characteristic or the like, so that it is possible to increase durability.

In this structure, the stabilizer 13 is mounted and fixed to the base end portion of the arm piece 6 in a state of fitting the base end portion of the arm piece 6 to the concave portion 13d formed by the protruding piece 13c protruding from the upper piece portion 13a. This mount constitutes the positioning means and the vibration preventing means. Accordingly, a pair of protruding pieces 13c above the side piece portions 13b are brought into contact with the side surfaces of the arm piece 6, whereby the stabilizer 13 is positioned and prevented from oscillating in the wiping and oscillating directions. In addition, the stabilizer 13 is positioned in the arm length direction by the protruding piece 13c orthogonal to the arm length direction at the base end side. Such improves the mounting accuracy of the stabilizer 13. As a result of the mounting, the stabilizer 13 has no play with respect to the wiper arm 1, and it is possible to obtain a good following characteristic.

Further, when the arm piece 6, to which the stabilizer 13 is mounted, is mounted to the arm shank 5, the stabilizer 13 is provided so as to be fitted to the concave portion having the C cross sectional shape of the arm shank 5, and both of the side piece portions 5b hold the upper portion all around the longitudinal direction of the stabilizer side piece portion 13b. Accordingly, there is no problem that the stabilizer 13 has a play with respect to the arm shank 5. In the case where the oscillating load by the wiper blade 3 is applied, the load can be borne by the entire stabilizer in the longitudinal direction, thereby achieving improvement in durability.

In the structure, the stabilizer 13 is provided in the wiper blade 3 via the support receiving body 15, whereby the oscillation (sliding) of the stabilizer 13 toward and away from the window surface is carried out between the stabilizer and the side piece portions 15b of the support receiving body 15. In this case, because the outer surface of each of the side piece portions 15b is formed in the flat shape, it is possible to make a relative oscillation with respect to the ribs 13h of the stabilizer 13 smooth and small in sliding resistance. Further, in this structure, the support receiving body 15 is structured such that the extension portion P2 is formed to extend from the fitting and attaching portion P1 which is attached to the first lever terminal end portion 10d. The extension portion P2 faces the second lever 11, pivoted to the first lever 10, at the side of the wiper shaft 2, which allows the extension portion P2 to regulate the movements of the second lever 11 in the oscillating direction. Therefore, the following characteristic, or performance, of the wiper blade 3 via the stabilizer 13 with respect to the wiper arm can be further improved.

In addition, because the support receiving body 15 is structured such that the fitting and attaching portion P1, formed in a thin shape, is attached to the first lever terminal end portion 10d by elastic deformation, the mounting operation to the first lever 10d is simply and easily performed.

Also, the support receiving body 15 is formed to have a different outer shape between the fitting and attaching portion P1 opposing to the side of the first lever 10 and the extension portion P2 opposing to the side of the second lever 12, and asymmetrical in the lever length direction. Therefore, it is possible to reduce the trouble that the support receiving body 15 is mounted to the wiper blade 3 in a wrong direction, and an improvement of an assembling characteristic can be achieved.

Further, in the side piece portions 15a of the support receiving body 15, the engagement hook 15d engages with the window surface side edge portion B1 of the rectangular pivot piece portion B formed in the first lever terminal end portion 10d. The partition step portion 15e and the step portion 15f respectively engage with both end edge portions B2, B3 in the lever length direction, whereby prevention of coming-off or separation of the two pieces is achieved in both directions, the window surface direction and the arm length direction. As a result, the support receiving body 15 is securely fixed to the first lever terminal end portion 10d, and it is possible to avoid problems such as the dropout or the like.

It goes without saying that the invention is not limited to the exemplary embodiment described above, and the positioning means and the vibration preventing means between the stabilizer and the wiper arm may be structured as follows.

Figure 11A:
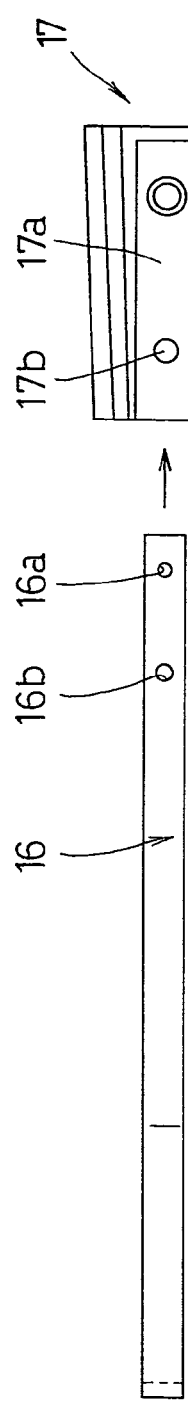
FIG. 11A is a front elevational view of a second embodiment which describes a mounting state between an arm piece and a stabilizer.
Figure 11B:
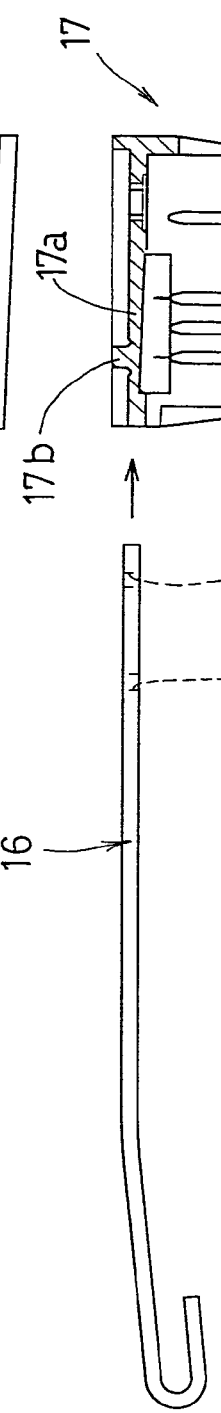
FIG. 11B is a side elevation cross sectional view of the second embodiment which shows the mounting state of the arm piece and the stabilizer.

That is, in a structure in accordance with a second embodiment, shown in FIGS. 11(A) and 11 (B), a through hole 16a for fixing a stabilizer 17 to a base end side is opened in a portion of an arm piece 16 corresponding to a stabilizer 17 mounting portion. Another through hole (a second through hole)16b is opened so as to be positioned in more leading end side than the through hole 16a. On the other hand, a protruding portion 17b protruding toward an upper side from an upper surface of an upper piece portion 17a is integrally formed in the stabilizer 17. Further, the structure is such that a positioning and an oscillation prevention of the stabilizer 17 with respect to the arm piece 16 are carried out by fitting the protruding portion 17b into the arm piece second through hole 16b.

Figure 11C:
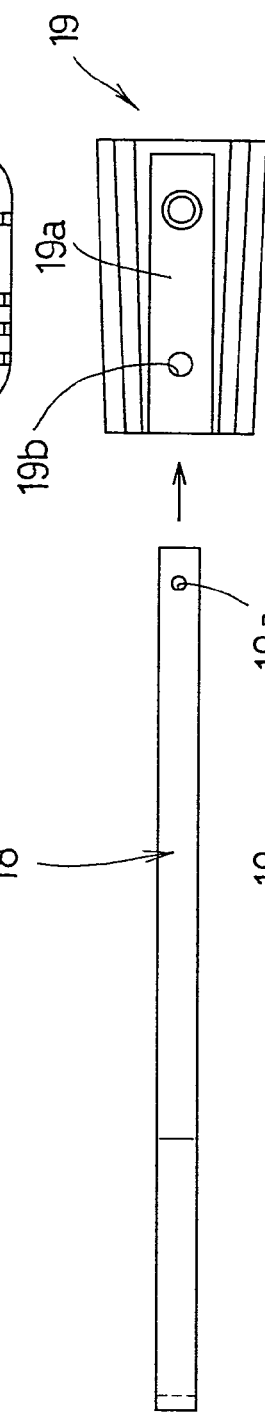
FIG. 11C is a front elevational view of a third embodiment which describes a mounting state of an arm piece and a stabilizer.
Figure 11D:
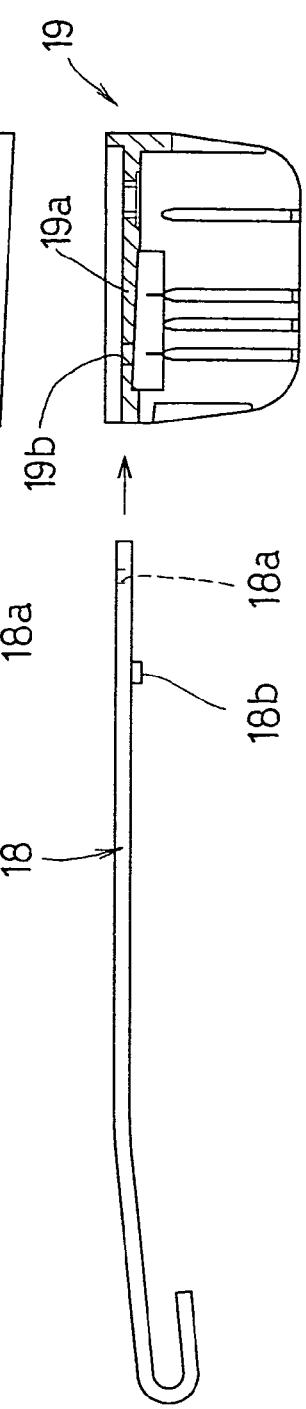
FIG. 11D is a side elevation cross sectional view of the third embodiment which shows the mounting state of the arm piece and the stabilizer.

In a variation, in a structure in accordance with a third embodiment, shown in FIGS. 11(C) and 11(D), a through hole 18a in an arm piece 18, for fixing a stabilizer 19 to a base end side, is opened in a portion corresponding to a stabilizer 19 mounting portion. A protruding portion 18b protruding downwardly is formed so as to be positioned at a more leading end side than the through hole 18a. On the other hand, a through hole 19b is opened in an upper piece portion 19a in the stabilizer 19, whereby the structure is made such that a positioning and an oscillation prevention of the stabilizer 19 with respect to the arm piece 18 are carried out by fitting the protruding portion 18b at the arm piece 18 side into the through hole 19b at the stabilizer 19 side.

As mentioned above, the arm piece and the stabilizer can provide the mutually positioning and oscillation preventing means by forming the engagement portions which are engaged with each other in a state of being displaced with respect to the screwing portion for fixing the arm piece and the stabilizer, and it is possible to make the following characteristic between the wiper arm and the wiper blade more excellent by providing the means.

The invention is useful in the field of the blade supporting apparatus in the wiper apparatus which is equipped in a vehicle, such as the private car, the truck, the bus or the like, so that a smooth wiping operation can be performed and the durability of the wiper apparatus is increased; the design characteristic is intended to be excellent; it is intended to improve the assembling accuracy of the supporting member; it is intended to commonly use the members; and it is intended to increase the following characteristic of the wiper blade via the stabilizer with respect to the wiper arm in a stable state having no play.

What is claimed is:

1. A blade supporting apparatus in a wiper apparatus in which a wiper blade mounted to a leading end portion of a wiper arm wipes a window surface in correspondence to a normal and reverse rotation of a wiper shaft integrally mounted to a base end portion of the wiper arm, a middle portion of the wiper blade pivotably supported by the leading end portion of the wiper arm via a pivot substantially orthogonal to an arm length direction so as to freely oscillate, the blade supporting apparatus comprising a supporting member provided in the wiper arm to movably support, toward and away from the window surface, the portion of the wiper blade nearer to the wiper shaft side than the middle portion of the wiper blade, the supporting member having a supporting concave portion formed in the supporting member so as to receive and support the wiper blade and a plurality of ribs extending toward the window surface formed on an inner surface of the supporting concave portion so as to be in linear contact with the wiper blade, and the supporting member supports a blade lever constituting the wiper blade, and a support receiving body insertedly fitted to the supporting concave portion of the supporting member is provided in a supporting portion of the blade lever in a come-off preventing manner and contacting in linear with the plurality of ribs of the supporting member.

2. The blade supporting apparatus according to claim 1, wherein an upper piece portion providing the supporting concave portion of the supporting member is fixed to the wiper arm.

3. The blade supporting apparatus according to claim 2, wherein the wiper arm is structured such that a base end portion of an arm piece, to which the wiper blade is mounted at a leading end portion thereof, is fixedly fitted into a leading end portion of an arm shank formed in a substantially C shape in a cross section, an open side of which faces the window surface, and the supporting member is fixed to the base end portion of the arm piece via a bolt screwed from an inside of the supporting concave portion, and is fixed to the leading end portion of the arm shank together with the arm piece.

4. The blade supporting apparatus according to claim 1, wherein the wiper arm is structured such that a base end portion of an arm piece, to which the wiper blade is mounted at a leading end portion thereof, is fixedly fitted into a leading end portion of an arm shank formed in a substantially C shape in a cross section, an open side of which faces the window surface, and the supporting member is fixed to the base end portion of the arm piece via a bolt screwed from an inside of the supporting concave portion, and is fixed to the leading end portion of the arm shank together with the arm piece.

5. The blade supporting apparatus according to claim 4, wherein positioning means for fitting the arm piece in a positioning manner is formed in an assembling portion of the supporting member with the arm piece.

6. The blade supporting apparatus according to claim 5, wherein the positioning means comprises a pair of protruding pieces extending in the arm length direction of the wiper arm and a protruding piece orthogonal to the arm length direction, a base end of the arm piece contacting the orthogonal protruding piece for positioning, and also acts as anti-vibration means for preventing the supporting member from vibrating with respect to the arm piece.

7. The blade supporting apparatus in a wiper apparatus according to claim 1, wherein the supporting portion of the blade lever is disposed near a pivot portion pivoting a first lever connected to the wiper arm and a second lever, and at least one rib in the supporting concave portion of the supporting member opposes to a pin fastened to the pivot portion.

8. The blade supporting apparatus according to claim 7, wherein a through hole allowing both end portions of a pin between the first lever and the second lever to protrude and be exposed to the outside is opened in the support receiving body.

9. The blade supporting apparatus according to claim 8, wherein the support receiving body is open toward the window surface and is formed in a substantially C cross sectional shape, and the support receiving body is provided with a fitting and attaching portion fitting to the pivot portion pivoting the first lever and the second lever, and an extension portion extended from the fitting and attaching portion to regulate a movement of the second lever in a wiping direction.

10. The blade supporting apparatus in a wiper apparatus according to claim 9, wherein the fitting and attaching portion of the support receiving body is thinner than the extension portion, and the fitting to the first lever is achieved by an elastic deformation of the fitting and attaching portion.

11. The blade supporting apparatus in a wiper apparatus according to claim 10, wherein a first step portion engaging with the first lever at the window surface side to achieve a come-off prevention and a second step portion engaging with the first lever in the lever length direction to achieve a come-off prevention in the lever length direction are formed in the fitting and attaching portion of the support receiving body.

12. The blade supporting apparatus according to claim 11, wherein the second step portion is formed so as to be positioned at both end portions of the first step portion in the lever length direction.

13. The blade supporting apparatus in a wiper apparatus according to claim 12, wherein at least one second step portion is continuously formed with the first step portion.

14. A blade supporting mechanism in a wiper apparatus for a window surface, the wiper apparatus having a wiper arm shaft connected at one end to an oscillation shaft and having a wiper blade connected at the other end, the wiper blade having a wiping blade mounted to a lever arm assembly having a plurality of levers including at least a main lever and a secondary lever pivotally mounted to each end of the main lever, the main lever pivotably mounted to the other end of the arm shaft, the arm shaft made up of at least an arm piece at the other end and an arm portion connected to the oscillation shaft, the blade supporting mechanism comprising:

a support receiving body mounted at a pivotal connection of the main lever to a secondary lever closest to the oscillation shaft; and a stabilizer mounted in the arm portion to oppose and receive the support receiving body, wherein a plurality of ribs are formed on a one of inner side surfaces of the stabilizer and outer side surfaces of the support receiving body, the ribs extending in a direction toward and away from the window surface.

15. The blade supporting mechanism according to claim 14, wherein the support receiving body has an upside down U-shaped cross-section, and comprises a fitting and attaching portion and an extension portion.

16. The blade supporting mechanism according to claim 15, wherein the main lever has an expanded end portion at the pivotal mount with the second lever and the fitting and attaching portion has a complementary fitting portion within inner sides to receive and retain the expanded end portion when the support receiving body is mounted to the pivotal mount of the main lever and the secondary lever at an end closest to the oscillation shaft.

17. The blade supporting mechanism according to claim 16, wherein the stabilizer has an upside down U-shaped cross section, the closed base mounted in the arm portion and having a channel therein which is closed by the arm portion, an end of the arm shaft received in the channel and fixed therein.

18. The blade supporting mechanism according to claim 17, wherein the closed end of the support receiving body is received in an open end of the stabilizer in a manner such that inner side surfaces of the stabilizer are in slideable contact with outer side surfaces of the support receiving body.

19. The blade supporting mechanism according to claim 14, wherein the plurality of ribs are formed on the inner side surfaces of the stabilizer and one rib opposes the pivotal connection of the main lever and the secondary lever closest to the oscillation shaft.

* * * * *